United States Patent
Unzueta et al.

(10) Patent No.: US 12,488,596 B2
(45) Date of Patent: Dec. 2, 2025

(54) GENERATING LONG-RANGE OBJECTS DATASET USING PROXIMAL TIME-SYNCED DATA FOR OBJECT DETECTION MODELS

(71) Applicant: GM CRUISE HOLDINGS LLC, San Francisco, CA (US)

(72) Inventors: Marc Unzueta, Munich (DE); Michael Meyer, Munich (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 278 days.

(21) Appl. No.: 18/155,936

(22) Filed: Jan. 18, 2023

(65) Prior Publication Data
US 2024/0242508 A1     Jul. 18, 2024

(51) Int. Cl.
G06V 20/58     (2022.01)
B60W 60/00     (2020.01)
G06V 10/774    (2022.01)

(52) U.S. Cl.
CPC ............ G06V 20/58 (2022.01); G06V 10/774 (2022.01); *B60W 60/001* (2020.02); *B60W 2420/403* (2013.01); *B60W 2420/408* (2024.01); *B60W 2556/45* (2020.02)

(58) Field of Classification Search
CPC . G06V 20/58; G06V 10/774; B60W 2556/45; B60W 60/001; B60W 2420/408; B60W 2420/403
See application file for complete search history.

(56) References Cited

U.S. PATENT DOCUMENTS

| | | | |
|---|---|---|---|
| 9,507,346 B1 * | 11/2016 | Levinson | G06F 3/04847 |
| 11,531,088 B2 * | 12/2022 | Popov | G01S 13/865 |
| 2019/0265712 A1 * | 8/2019 | Satzoda | B60W 40/09 |
| 2019/0310627 A1 * | 10/2019 | Halder | G05D 1/0033 |
| 2021/0309248 A1 * | 10/2021 | Choe | G06N 3/04 |
| 2023/0182732 A1 * | 6/2023 | Horita | G01S 17/931 701/93 |
| 2023/0192145 A1 * | 6/2023 | Das | G01S 13/865 |
| 2024/0386597 A1 * | 11/2024 | Sathianathan | G06V 20/52 |

* cited by examiner

*Primary Examiner* — Pinalben Patel
(74) *Attorney, Agent, or Firm* — Honigman LLP; Matthew H. Szalach; Jonathan P. O'Brien

(57) ABSTRACT

Disclosed are embodiments for generating long-range objects dataset using proximal time-synced data for object detection models. In some aspects, a method includes receiving a set of sensor data for a first autonomous vehicle (AV) corresponding to first scene data that is part of an intersecting field of view (FoV) with second scene data of a second AV; inputting the set of sensor data to a simulated trained object detection model of the first AV to generate a first set of object detections for the first scene data; comparing the first set with a second set of object detections generated for the second scene data; supplementing the first set of object detections with information from the second set of object detections to generate a supplemental set of object detections; and generating, using the supplemental set of object detections, a training data set for an object detection model of the first AV.

20 Claims, 8 Drawing Sheets

400

Receive a set of sensor data for a first AV corresponding first scene data previously captured for the first AV, wherein the first scene data is part of an intersecting FoV with second scene data of a second AV
410

Input the set of sensor data to a simulated trained object detection model of the first AV to generate a first set of object detections for the first scene data
420

Compare the first set of object detections with a second set of object detections generated for the second scene data of the second AV
430

Supplement, based on the comparing, the first set of object detections with information from the second set of object detections in order to generate a supplemental set of object detections
440

Generate, using the supplemental set of object detections, a training data set for an object detection model of the first AV
450

Selecting a set of scenes from a collection of pre-recorded scene data, the selecting based on a query to identify scenes having an intersecting field of view during a same timestamp
510

Identify a first AV and a second AV corresponding to the selected scenes
520

Simulate ML object detection models of the first AV and of the second AV on the selected scenes to generate object detections in the selected scenes
530

Identify objects that are long-range in a first AV's object detections and that are closer to a second AV's object detections to be transferred from the second AV to the first AV
540

Transfer the identified objects to first AV's object detections to create a supplemented object detections
550

Generate labeled object data set from the supplemented object detections of the first AV
560

Utilize the labeled object data set to train and/or evaluate an ML object detection model for the first AV
570

*FIG. 5*

GENERATING LONG-RANGE OBJECTS DATASET USING PROXIMAL TIME-SYNCED DATA FOR OBJECT DETECTION MODELS

BACKGROUND

1. Technical Field

The disclosure generally relates to the field of processing systems and, more specifically, to generating long-range objects dataset using proximal time-synced data for object detection models.

2. Introduction

Autonomous vehicles, also known as self-driving cars, driverless vehicles, and robotic vehicles, may be vehicles that use multiple sensors to sense the environment and move without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

Autonomous vehicles can utilize one or more trained machine learning (ML)-based models that autonomously control and/or operate the vehicle. The trained model(s) can utilize the data and measurements captured by the sensors of the autonomous vehicle to identify, classify, and/or track objects within the autonomous vehicle's environment. The model(s) utilized by the autonomous vehicle may be trained using any of various suitable types of learning, such as supervised learning, and may be trained using real-world image data and/or image data generated in a simulated environment that have been labeled according to "correct" outputs of one or more perception functions (e.g., segmentation, classification, and/or tracking) of the autonomous vehicle.

BRIEF DESCRIPTION OF THE DRAWINGS

The various advantages and features of the disclosed technology will become apparent by reference to specific implementations illustrated in the appended drawings. A person of ordinary skill in the art will understand that these drawings show some examples of the disclosed technology and would not limit the scope of the disclosed technology to these examples.

Furthermore, the skilled artisan will appreciate the principles of the disclosed technology as described and explained with additional specificity and detail through the use of the accompanying drawings in which:

FIG. 4 illustrates an example method for generating a training dataset using proximal time-synced data for object detection models, in accordance with embodiments herein;

FIG. 5 illustrates an example method for generating long-range objects dataset using proximal time-synced data for object detection models, in accordance with embodiments herein;

DETAILED DESCRIPTION

Figure 1:
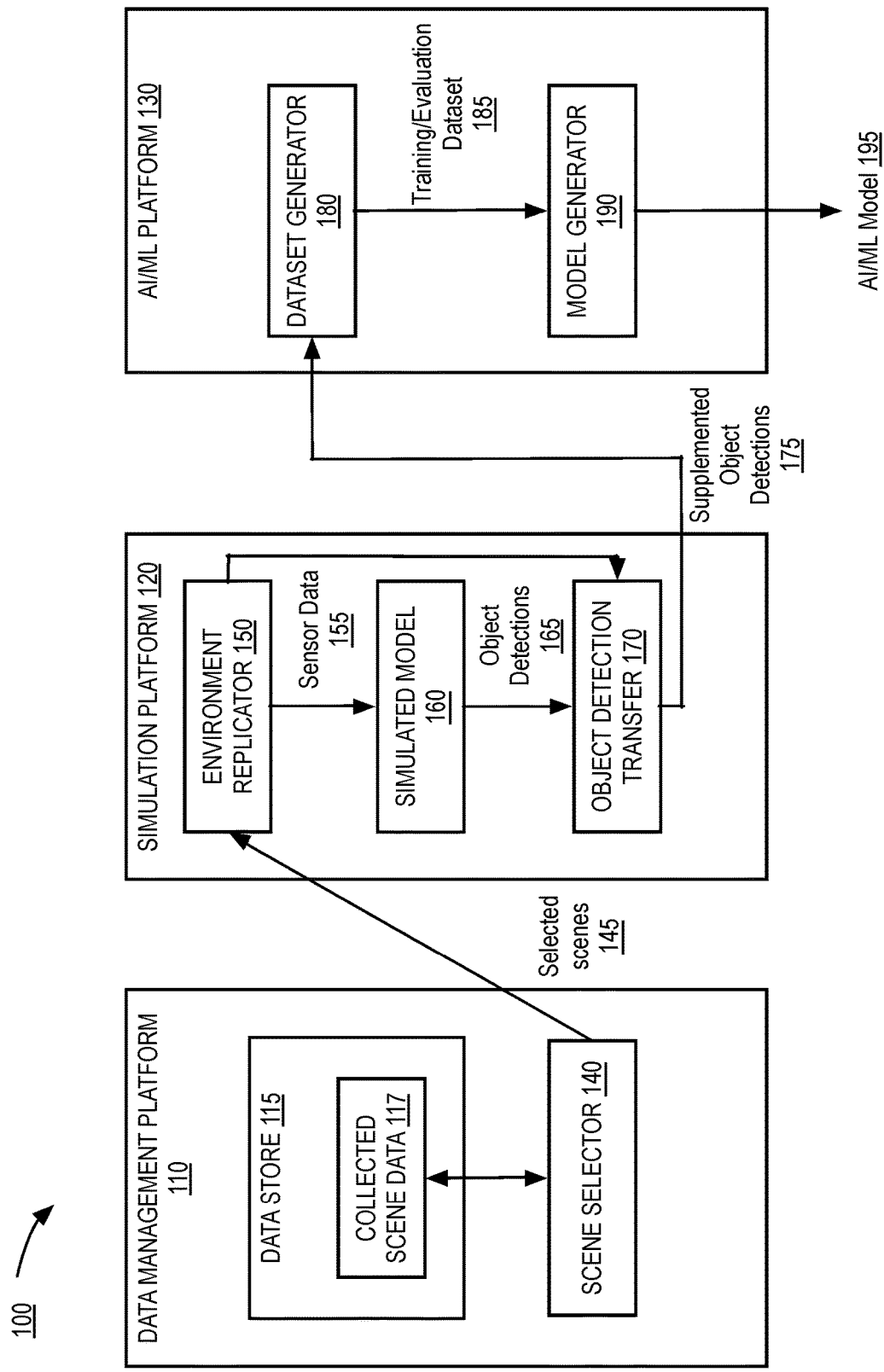
FIG. 1 is a block diagram of an example training dataset generation system illustrating generating long-range objects dataset using proximal time-synced data for object detection models, in accordance with embodiments herein.

The detailed description set forth below is intended as a description of various configurations of the subject technology and is not intended to represent the configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Autonomous vehicles (AVs), also known as self-driving cars, driverless vehicles, and robotic vehicles, can be implemented by companies to provide self-driving car services for the public, such as taxi or ride-haling (e.g., ridesharing) services. The AV can navigate about roadways without a human driver based upon sensor signals output by sensor systems deployed on the AV. AVs may utilize multiple sensors to sense the environment and move without a human driver. An example AV can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

AVs can utilize one or more trained machine learning (ML)-based models that autonomously control and/or operate the vehicle. The trained model(s) can utilize the data and measurements captured by the sensors of the AV to identify, classify, and/or track objects (e.g., vehicles, people, stationary objects, structures, animals, etc.) within the AV's environment. The model(s) utilized by the AV may be trained using any of various suitable types of learning, such as supervised learning, and may be trained using real-world image data and/or image data generated in a simulated environment that have been labeled according to "correct" outputs of one or more perception functions (e.g., segmentation, classification, and/or tracking) of the AV. Generating a robust and accurate training data set directly impacts the effectiveness and accuracy of the trained models utilized in the AV.

Some techniques for identifying and labeling objects for the purposes of generating training data for training models for the AV utilize source data that was previously generated by AVs (e.g., captured by the AV during the course of its operations), such as data generated by the sensors of the AV including RADAR sensor data, LIDAR sensor data, camera data, and so on. Some techniques for identifying and labeling objects for the purposes of generating training data for training models for the AV utilize source data that was generated in a simulated environment. Other techniques may utilize a combination of the above. In each of these cases, the data for the training of the model can include image data frames, where objects depicted in those image data frames are bounded (e.g., delineated) and correctly labeled (e.g., identified or annotated). In some cases, thousands, if not millions, of labeled image data frames may be used to sufficiently train a model for an AV.

There are a number of challenges being faced when trying to identify and label objects for purposes of generating training data for training models for the AV. One challenge is that simulated RADAR data is not reliable enough to be used as a source for training models. Moreover, labeling is not possible using RADAR data. As such, LIDAR data is generally utilized for purposes of labeling training data. In these cases, LIDAR is considered the ground truth (GT) sensor. However, LIDAR does not provide a strong enough return at long ranges, which limits the amount of data that can be accurately labeled. In some cases, a human may utilize a computer tool to indicate and label objects within the image data frames. However, a human using a conventional labeling tool can be a time-consuming and inefficient process, as well as suffer from human errors, inaccuracies, and inconsistencies.

Further challenges of the identification and labeling of objects for purposes of generating training data include the lack of annotated occluded (e.g., obstructed, hidden) objects in training data sets. Furthermore, labeling sequential data (e.g., over multiple frames and multiple images) can be an expensive and burdensome (e.g., time-consuming) process, but should be performed as part of generating training data. As such, a technique to decrease the time utilized to label training data (moreover, sequential training data), as well as to increase the efficiency and accuracy of the labeling itself, would increase both the amount and quality of labeled data used to train the model for the AV, and improve the trained model for the AV.

Embodiments herein address the above-described technical problems and challenges by providing techniques for generating long-range objects dataset using proximal time-synced data for models, such as object detection models utilized by an AV. The approach of embodiments herein can generate a long-range training dataset including long-range objects having reliable labels. In some implementations, "long-range" may refer to distances beyond a determined LIDAR labeling range. The LIDAR labeling range may include a determined distance from the LIDAR sensor that is known to produce accurate object detection and annotation. For example, some LIDAR sensors are known to decrease their density beyond 100 meters (m) and, in this case, "long-range" may be considered those distances beyond 100 m. While LIDAR is known to decrease in density beyond a certain range, RADAR is known to provide a stronger return at longer distances and can be used to provide more accurate object detections.

As such, implementations herein may identify two or more AVs having intersecting fields of view (FoVs). Within the intersecting FoVs, a set of sensor data (of the AVs) corresponding to the intersecting FoVs is analyzed. Objects are delineated and labeled by applying an existing trained model, such as a trained object detection model, to the set of sensor data. Among the detected objects in the intersecting FoVs, it is determined whether any of the identified objects are overlapping tracked objects that have approximately the same location. Each overlapping tracked object is assumed to be referencing the same underlying object. In one embodiment, object information (e.g., location data, dimension data, orientation data, etc.) for the object that is closer to an AV is associated with each of the overlapping tracked objects from the other AVs.

Furthermore, the set of sensor data from each AV may be examined/utilized to identify matching objects that may not be expressly labeled by a particular AV (via the object detection model), but are still "visible" in sensor data of the AV (e.g., object is detected/visible in long-range RADAR point cloud data but not labeled by the object detection model due to long-range limitations of LIDAR). Such objects may be determined to be matching/overlapping with a labeled object from another AV in the intersecting FoV, and thus can be transferred to the set of detected objects of the particular AV.

In one example, RADAR point cloud data may be used for the overlapping object detection and matching. For example, a first AV in the set of AVs may detect and label an object at a close range distance (e.g., using LIDAR sensor data) via the trained object detection model, while a second AV may not detect or label that object via the trained object detection model because the object is in a long-range distance of the second AV (e.g., due to the long-range limitations of LIDAR object detection previously noted). However, the object may be "visible" (detectable) to the second AV in RADAR point cloud data of the second AV. In this case, the object as detected and labeled by the first AV may be matched to the object that is visible in the RADAR point cloud data of the second AV. This object may then be transferred to and included in the set of object detections of the second AV that can be used to generate a training dataset (and/or an evaluation dataset) that includes long-range object detections for the object detection model.

Although some embodiments herein are described as operating in an AV, other embodiments may be implemented in an environment that is not an AV, such as, for example, other types of vehicles (human operated, driver-assisted vehicles, etc.), air and terrestrial traffic control, radar astronomy, air-defense systems, anti-missile systems, marine radars to locate landmarks and other ships, aircraft anti-collision systems, ocean surveillance systems, outer space surveillance and rendezvous systems, meteorological precipitation monitoring, altimetry and flight control systems, guided missile target locating systems, ground-penetrating radar for geological observations, and so on. The following description discussed embodiments as implemented in an automotive environment, but one skilled in the art will appreciate that embodiments may be implemented in a variety of different environments and use cases. Further details of the generating long-range objects dataset using proximal time-synced data for object detection models of embodiments herein are further described below with respect to FIGS. 1-8.

FIG. 1 is a block diagram of an example training dataset generation system 100 illustrating generating long-range objects dataset using proximal time-synced data for object detection models, in accordance with embodiments herein. In one embodiment, training dataset generation system 100 implements generating long-range objects dataset using proximal time-synced data for object detection models, as described further herein. The training dataset generation system 100 of FIG. 1 can be, for example, part of a data center that is cloud-based or otherwise. In other examples, the training dataset generation system 100 can be part of an AV or a human-operated vehicle having an advanced driver assistance system (ADAS) that can utilize various sensors including radar sensors.

In one embodiment, training dataset generation system 100 can communicate over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.). In one embodiment, training dataset generation system 100 can be implemented using a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The training dataset generation system 100 may be part of a data center for managing a fleet of AVs and AV-related services. The data center can send and receive various signals to and from an AV. These signals can include sensor data captured by the sensor systems of the AV, roadside assistance requests, software updates, ridesharing pick-up and drop-off instructions, and so forth. In some examples, the training dataset generation system 100 may be hosted in a data center that may also support a ridesharing service, a delivery service, a remote/roadside assistance service, street services (e.g., street mapping, street patrol, street cleaning, street metering, parking reservation, etc.), and the like. In some embodiments, the training dataset generation system 100 may be implemented in the AV itself or may be implemented in a server computing device.

In this example, the training dataset generation system 100 includes one or more of a data management platform 110, a simulation platform 120, and an Artificial Intelligence/Machine Learning (AI/ML) platform 130, among other systems.

Data management platform 110 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. In one embodiment, the data management platform includes a data store 115 that stores collected scene data 117 collected from operation of one or more AVs.

The simulation platform 120 can enable testing and validation of the algorithms, machine learning models, neural networks, and other development efforts for the AV, among other platforms and systems. The simulation platform 120 can replicate a variety of driving environments and/or reproduce real-world scenarios from data captured by the AV, including rendering geospatial information and road infrastructure (e.g., streets, lanes, crosswalks, traffic lights, stop signs, etc.); modeling the behavior of other vehicles, bicycles, pedestrians, and other dynamic elements; simulating inclement weather conditions, different traffic scenarios; and so on.

The AI/ML platform 130 can provide the infrastructure for training and evaluating machine learning algorithms for operating the AV, the simulation platform 120, and other platforms and systems. Using the AI/ML platform 130, data scientists can prepare data sets from the data management platform 110; select, design, and train machine learning models; evaluate, refine, and deploy the models; maintain, monitor, and retrain the models; and so on.

In embodiments herein, the training dataset generation system 100 is utilized to generate a long-range objects dataset using proximal time-synced data for models, such as object detection models utilized by an AV. The training dataset generation system 100 can generate a long-range training dataset including long-range objects having reliable labels. As previously noted, "long-range" may refer to distances beyond a determined LIDAR labeling range. "Proximal" may refer to time-synced data that relates to or is situated near or close to the AV. The LIDAR labeling range may include a determined distance from the LIDAR sensor that is known to produce accurate object detection and labeling/annotation. For example, some LIDAR sensors are known to decrease their density beyond 100 meters (m) and, in this case, "long-range" may be considered those distances beyond 100 m. While LIDAR is known to decrease in density beyond a certain range, RADAR is known to provide a stronger return at longer distances and can be used to provide more accurate object detections.

Figure 2:
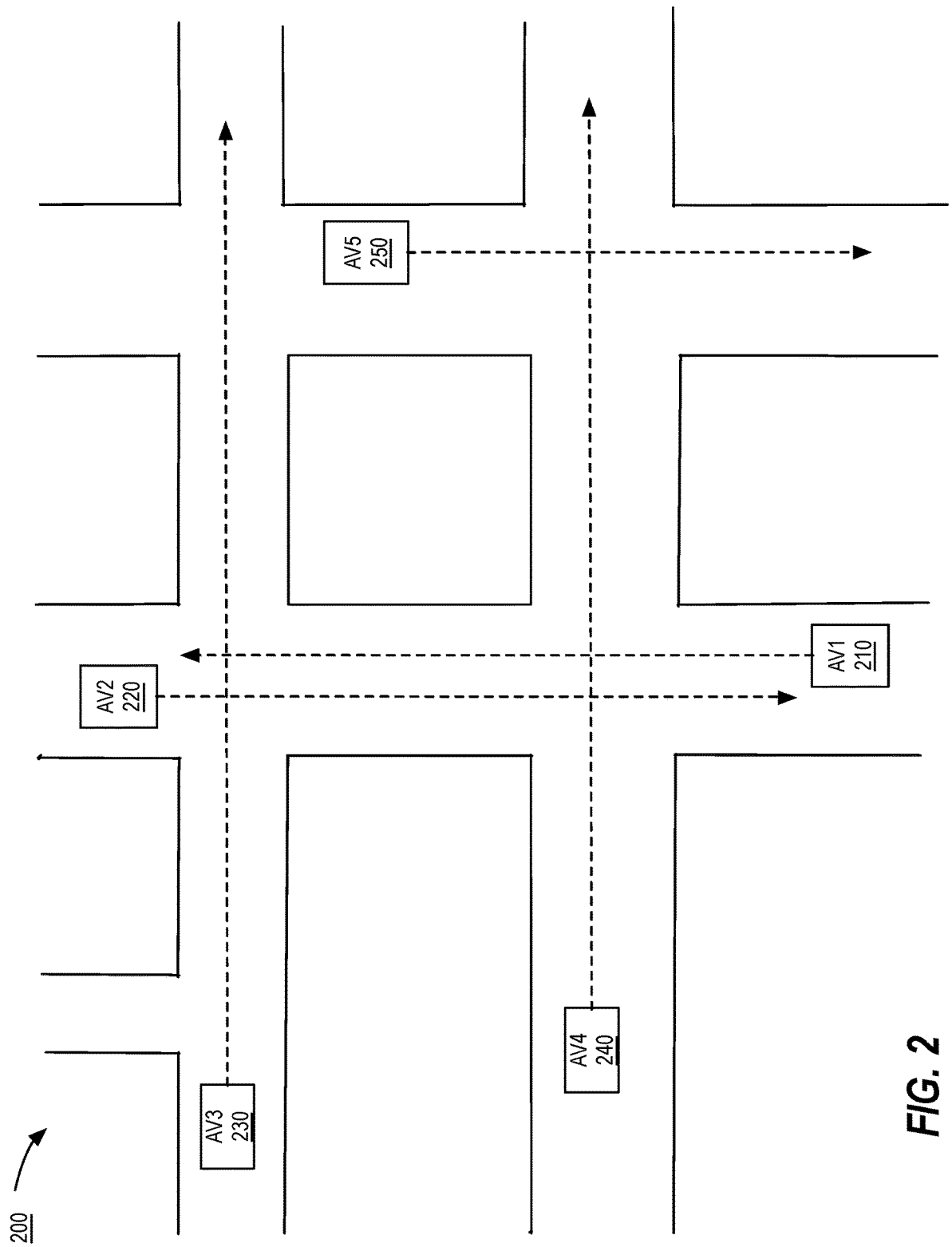
FIG. 2 illustrates an example map schematic depicting multiple autonomous vehicles (AVs) having intersecting field of views (FoVs), in accordance with an example embodiment herein.

The data management platform 110 may include a scene selector 140 that may identify image data frames (e.g., scenes) from two or more AVs having intersecting FoVs. FIG. 2 illustrates an example map schematic 200 depicting multiple AVs having intersecting FoVs, in accordance with an example embodiment herein. Map schematic 200 illustrates multiple AVs including AV1 210, AV2 220, AV3 230, AV4 240, and AV5 250 operating on a grid of streets. Each AV 210-250 has a dashed directional arrow indicating the direction in which the particular AV 210-250 is traveling. For the purposes of an example here, AV1 210 and AV2 220 may be considered as having an intersecting FoV as they are traveling towards one another and may be sensing (e.g., viewing) the same objects from different perspectives. In another example, AV1 210, AV2 220, and AV3 230 may be considered as having intersecting FoVs. Other permutations of AVs in map schematic 200 may also have intersecting FoVs even though they are not specifically called out herein.

Referring back to FIG. 1, in one embodiment, scene selector 140 may execute a query, such as an SQL query, on the collected scene data 117 to identify the two or more AVs based on location and/or timestamp data of the collected scene data 117. The scene selector 140 may then provide the selected scenes 145 to the simulation platform 120. In one embodiment, the scene selector 140 may identify the two or more AVs and as well as provide identifying information of the selected scenes 145 to the simulation platform 120.

The simulation platform 120 may include an environment replicator 150 that can replicate a variety of driving environments and/or reproduce real-world scenarios from data captured by the AV, including rendering geospatial information and road infrastructure (e.g., streets, lanes, crosswalks, traffic lights, stop signs, etc.); modeling the behavior of other vehicles, bicycles, pedestrians, and other dynamic elements; simulating inclement weather conditions, different traffic scenarios; and so on. In one embodiment, the simulation platform may also provide at least one simulated model 160. The simulated model 160 may refer to an emulated version of an object detection model deployed on the two or more AVs identified by the scene selector 140.

In one embodiment, the environment replicator 150 may replicate the driving environment of the selected scenes 145 to create a set of sensor data 155 of the two or more AVs that act as input to the simulated model 160. In one embodiment, the simulation platform 120 may provide a simulated model 160 for each AV of the two or more AVs and may replicate the driving environment for each of the AVs to generate sensor data to input to the individual simulated models 160. The simulated model(s) 160 can delineate and label (annotate) the objects by applying a trained object detection model to the set of sensor data 155. In one embodiment, labeling (annotating) the objects may include placing a bounding box around the detected object, attaching an identification (e.g., a type, etc.) to the object, and/or identifying object information (such as location, dimension, orientation, etc.) for the object.

The detected objects 165 in the intersecting FoVs are then passed, along with the original sensor data 155, to an object detection transfer 170 component of the simulation platform 120. For each AV of the two or more AVs having the intersecting FoVs, the object detection transfer 170 component may operate to (1) improve/update information (such as location data, dimension data, orientation data, etc.) corresponding to already-identified object detections, and/or may operate to (2) supplement the set of object detections for the AV by identifying additional (long-range) object detections that can be added to the set of object detections.

With respect to (1) improving/updating the information on the already-identified object detections, the object detection transfer 170 component can determine whether any of the identified objects between the two or more AVs can be categorized as overlapping tracked objects that have a "same" location (e.g., identified objects in approximately the same location). In one embodiment, an error margin may be applied when identifying overlapping tracked objects. In some embodiments, overlapping tracked objects may also be referred to herein as matching objects. The object detection transfer 170 component assumes that each overlapping tracked object is referencing the same underlying object. In some embodiments, other features may be utilized in the overlapping tracked object determination. For example, RADAR point cloud velocity data can be utilized to associate object detections between two or more AVs, where detected objects having a similar velocity may be more likely to be considered matching objects.

As the overlapped tracked objects may not each have the exact same location data, the object detection transfer 170 component may identify the particular object location provided by the AV that is closest to the overlapping tracked objects as the final object location of the overlapping tracked objects. In this case, the object information (such as location data, dimension data, orientation data, etc.) can be updated in the set of detected objects of the other AVs to indicate the assumedly more accurate object information corresponding to the closer AV. As a result, more accurate object detection information can be provided for each of the AVs.

With respect to (2) supplementing the set of object detections, the object detection transfer 170 component may utilize this approach when the simulated model 160 for an AV does not label certain objects in its FoV, but other sensor data 155 of that AV may still reflect a detection of that object (i.e., the object is "visible" to the AV). For example, an object may be "visible" in the long-range RADAR point cloud data of an AV, but is not labeled (annotated) by the simulated model 160 of the AV due to the long-range limitations of LIDAR noted above. In this case, the object detection transfer 170 component can utilize the set of sensor data 155 from each AV to aid in identifying the overlapping tracked objects that may not be labeled by a particular AV but are still "visible" in sensor data 155 of the AV. In one embodiment, an error margin may be applied such that any AV RADAR point cloud data (of a first AV) that is within a determined threshold distance (e.g., 10-30 cm, etc.) of a labeled bounding box of another AV's detected object may be considered to be a matching object. Such objects may be determined to be matching/overlapping with a labeled object from another AV in the intersecting FoV and thus can be transferred to the set of detected objects of the first AV by the object detection transfer 170 component. As a result, the object detection transfer 170 component can provide a more accurate and robust set of supplemented object detections 175 for the two or more AVs to the AI/ML platform 130.

Figure 3:
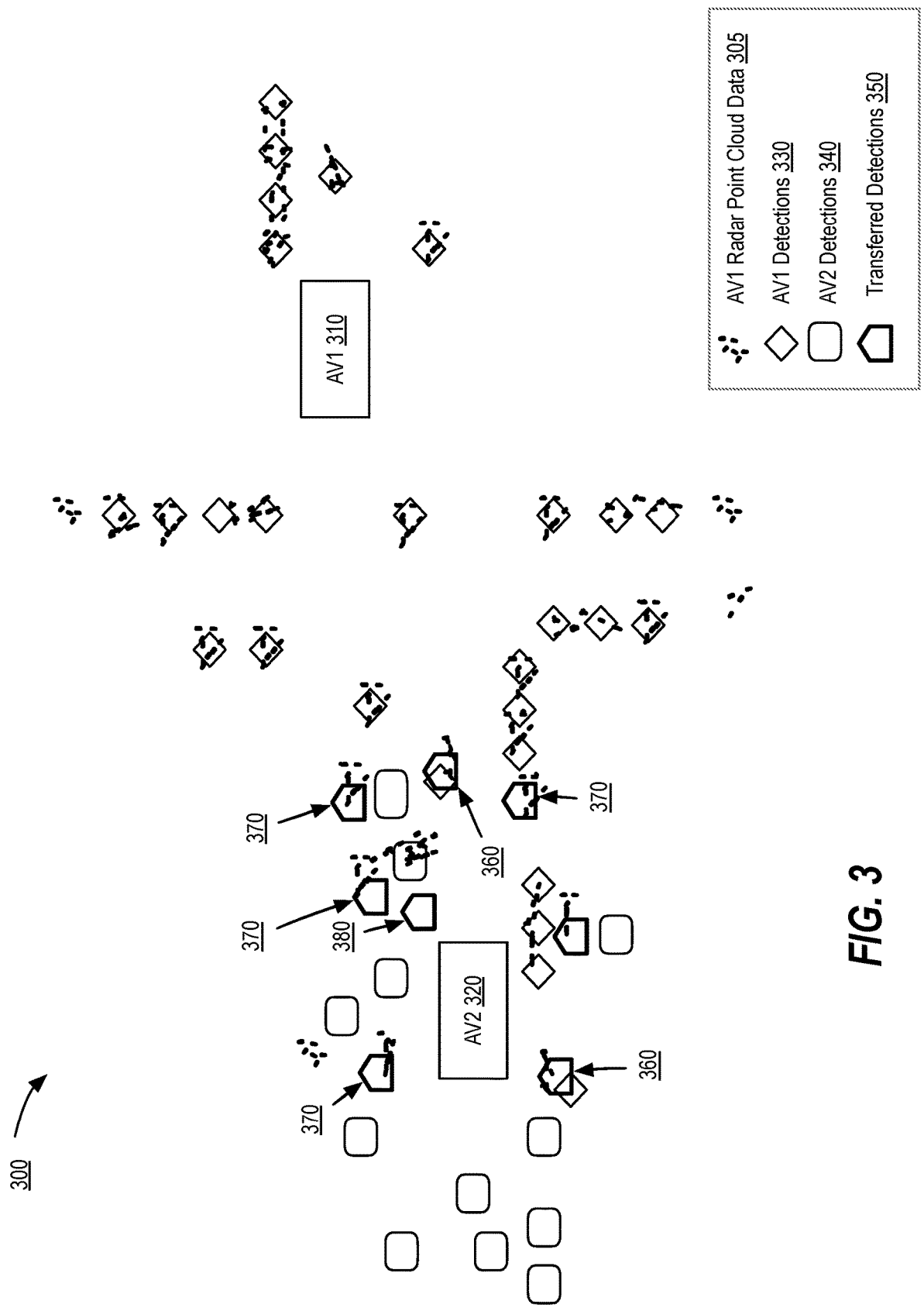
FIG. 3 is an example object detection schematic depicting transferred detections of overlapping tracked objects in intersecting FoVs of AVs, in accordance with embodiments herein.

FIG. 3 is an example object detection schematic 300 depicting transferred detections of overlapping tracked objects in intersecting FoVs of AVs, in accordance with embodiments herein. In one embodiment, the training dataset generation system 100 of FIG. 1 may replicate the driving environment depicted in object detection schematic 300. Object detection schematic 300 depicts two AVs, AV1 310 and AV2 320, that are determined to have intersecting FoVs. In one embodiment, AV1 310 may be the same as AV1 210 of FIGS. 2 and AV2 320 may be the same as AV2 220 of FIG. 2. In one embodiment, simulated models for each of AV1 310 and AV2 320 may be provided that generate the object detections 330, 340 shown in the schematic 300 for each AV 310, 320. It may be assumed that LIDAR sensor data (not shown) is utilized to generate the object detections 330, 340 for AV1 310 and AV2 320. The schematic 300 is also overlaid with RADAR point cloud data 305 from AV1, shown as the dispersed dots throughout the schematic 300.

In one embodiment, objects that are detected and labeled for both AV1 310 and AV2 320 are compared, and any overlapped tracked objects are identified. In the case of any object information discrepancies between the two objects (e.g., discrepancies between location data, dimension data, orientation data, and so on), the object information can be updated to be consistent with the object information provided by the closer AV. For example, objects 360 are objects that are identified and labeled by AV1 310 (via the simulated model), but that are updated (transferred 350) based on the object detections generated by AV2 320, as AV2 is the closer AV to those objects and presumably provides more accurate object information for the object detection.

In another embodiment, AV1 RADAR point cloud data 305 may be used for supplementing object detections. For example, objects 370 are examples of such objects. In this case, the simulated model for AV2 320 may detect and label objects 370 (using the simulated model) that are at a close range distance to AV2 320 (e.g., using LIDAR sensor data). However, AV1 310 may not detect or label these same objects 370 via the simulated model because the objects 370 are at a long-range distance from the AV1 310 (e.g., due to the long-range limitations of LIDAR object detection previously noted). Nevertheless, the object 370 may be "visible" (detectable) to the second AV using the RADAR point cloud data 305 of AV1 310. In this case, the objects 370, as detected and labeled by the AV2 320, may be matched to the objects 370 that are "visible" in the RADAR point cloud data 305 of AV1 310. These objects 370 may then be transferred to 350 (included in) the set of object detections of AV1 310.

The above examples of updating and/or supplementing the object detections for an AV may also be helpful for the case of occluded (e.g., blocked, obstructed, hidden, etc.) objects. Object 380 may be an example of such an occluded object. Object 380 may be considered an occluded object from the viewpoint of AV1 310, as there may have been another object in between the object 380 and AV1 310 that partially or fully blocked its visibility to AV1. However, object 380 may be partially or fully visible to AV2 320. In this case, the object information (e.g., location data, dimension data, orientation data, etc.) from the SV2 320 detections can be provided to the set of object detections for AV1 310. The occluded object 380 embodiment may also be helpful for multi-path detections in the RADAR space.

Referring back to FIG. 1, the updated and/or supplemented set of object detections 175 provided by embodiments herein can be passed to the AI/ML platform 130. AI/ML platform 130 may include a dataset generator 180 that uses the supplemented object detections 175 to generate a training/evaluation dataset 185. This training/evaluation dataset 185 can include long-range object detections that are used by model generator 190 to train and/or evaluate an object detection model 195 that is to be deployed to one or more AVs.

FIG. 4 illustrates an example method 400 for generating a training dataset using proximal time-synced data for object detection models, in accordance with embodiments herein. Although the example method 400 depicts a particular sequence of operations, the sequence may be altered without departing from the scope of the disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method 400 includes block 410 where a set of sensor data is received for a first AV corresponding to first scene data previously captured for the first AV. In one embodiment, the first scene data is part of an intersecting FoV with second scene data of a second AV. In one embodiment, the sensor data may include LIDAR sensor data, RADAR sensor data, camera data, and/or other types of sensor data. In some embodiments, the first scene data and the second scene data may be identified by executing an SQL query against a database of captured scene data to identify two or more AVs having intersecting FoVs.

Then, at block 420, the set of sensor data is input to a simulated trained object detection model of the first AV. In one embodiment, the simulated trained object detection model can generate a first set of object detections for the first scene data. In one embodiment, the simulated trained object detection model utilizes the LIDAR sensor data from the first AV as input to the model to generate its object detections.

Subsequently, at block 430, the first set of object detections are compared with a second set of object detections generated for the second scene data of the second AV. In one embodiment, comparing the sets of object detections includes identifying objects in both sets that overlap in terms of location and timestamp. In some embodiments, point cloud velocity data corresponding to the object may be utilized in the comparison.

In one embodiment, comparing the first set of object detections with the second set of object detections further includes identifying overlapping tracked objects comprised in the first set of object detections and the second set of object detections, the overlapping tracked objects comprising detected objects having a location within a determined threshold distance of one another. In another embodiment, comparing the first set of object detections with the second set of object detections further comprises identifying one or more objects in the second set of object detections with corresponding RADAR point cloud data of the set of sensor data of the first AV.

At block 440, the first set of object detections may be supplemented, based on the comparing of block 430, with information from the second set of object detections. This supplementation process generates a supplemental set of object detections. In one embodiment, supplementing the first set of object detections further comprises updating object information in the first set of object detections for the overlapping tracked objects that have a closer location to the second AV than the first AV. The object information may include at least one of location data, dimension data, or orientation data. In another embodiment, supplementing the first set of object detections further comprises adding object detections to first set of object detections that correspond to the identified one or more objects in the second set of object detections with corresponding RADAR point cloud data of the set of sensor data of the first AV.

Lastly, at block 450, a training data set is generated for an object detection model of the first AV using the supplemental set of object detections. In one embodiment, this training data set is utilized for training and/or evaluation of an object detection model for the first AV.

FIG. 5 illustrates an example method 500 for generating long-range objects dataset using proximal time-synced data for object detection models, in accordance with embodiments herein. Although the example method 500 depicts a particular sequence of operations, the sequence may be altered without departing from the scope of the disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method 500 includes block 510 where a set of scenes is selected from a collection of pre-recorded scene data. In one embodiment, the selecting is based on a query to identify scenes having an intersecting field of view during a same timestamp. In one embodiment, the query may be an SQL query. Then, at block 520, a first AV and a second AV corresponding to the selected scenes are identified.

At block 530, ML object detection models of the first AV and the of the second AV are simulated using the selected scenes as input data. In one embodiment, the simulated ML object detection models are to generate object detections in the selected scenes. In one embodiment, the simulated object detection models utilize LIDAR sensor data of the first AV and of the second AV as the input data.

Subsequently, at block 540, objects are identified that are long-range in the first AV's object detections and that are closer to the second AV's object detections to be transferred from second AV to the first AV. In one embodiment, long-range may refer to distances beyond a determined LIDAR labeling range. The LIDAR labeling range may include a determined distance from the LIDAR sensor that is known to produce accurate object detection and annotation.

Then, at block 550, the identified objects are transferred to first AV's object detections to create a supplemented objects detection. At block 560, a labeled object data set is generated from the supplemented object detections of the first AV. Lastly, at block 570, the labeled object data set is utilized to train and/or evaluate an ML object detection model for the first AV.

Figure 6:
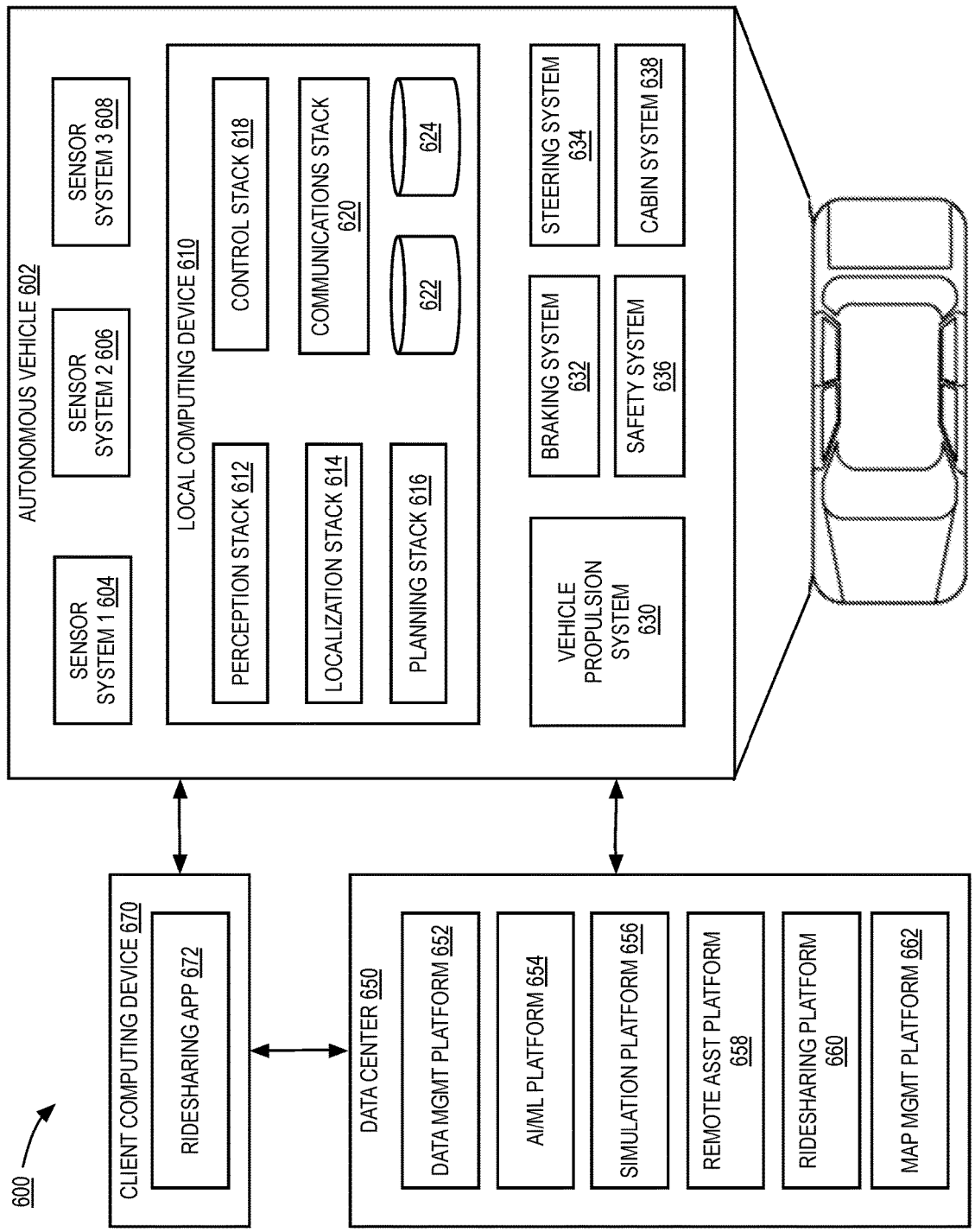
FIG. 6 illustrates an example system environment that can be used to facilitate autonomous vehicle (AV) dispatch and operations, according to some aspects of the disclosed technology.

Turning now to FIG. 6, this figure illustrates an example of an AV management system 600. In one embodiment, the AV management system 600 can implement generating long-range objects dataset using proximal time-synced data for object detection models, as described further herein. One of ordinary skill in the art will understand that, for the AV management system 600 and any system discussed in the disclosure, there can be additional or fewer components in similar or alternative configurations. The illustrations and examples provided in the disclosure are for conciseness and clarity. Other embodiments may include different numbers and/or types of elements, but one of ordinary skill the art will appreciate that such variations do not depart from the scope of the disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further below with respect to FIG. 7 and elsewhere in the disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Figure 7:
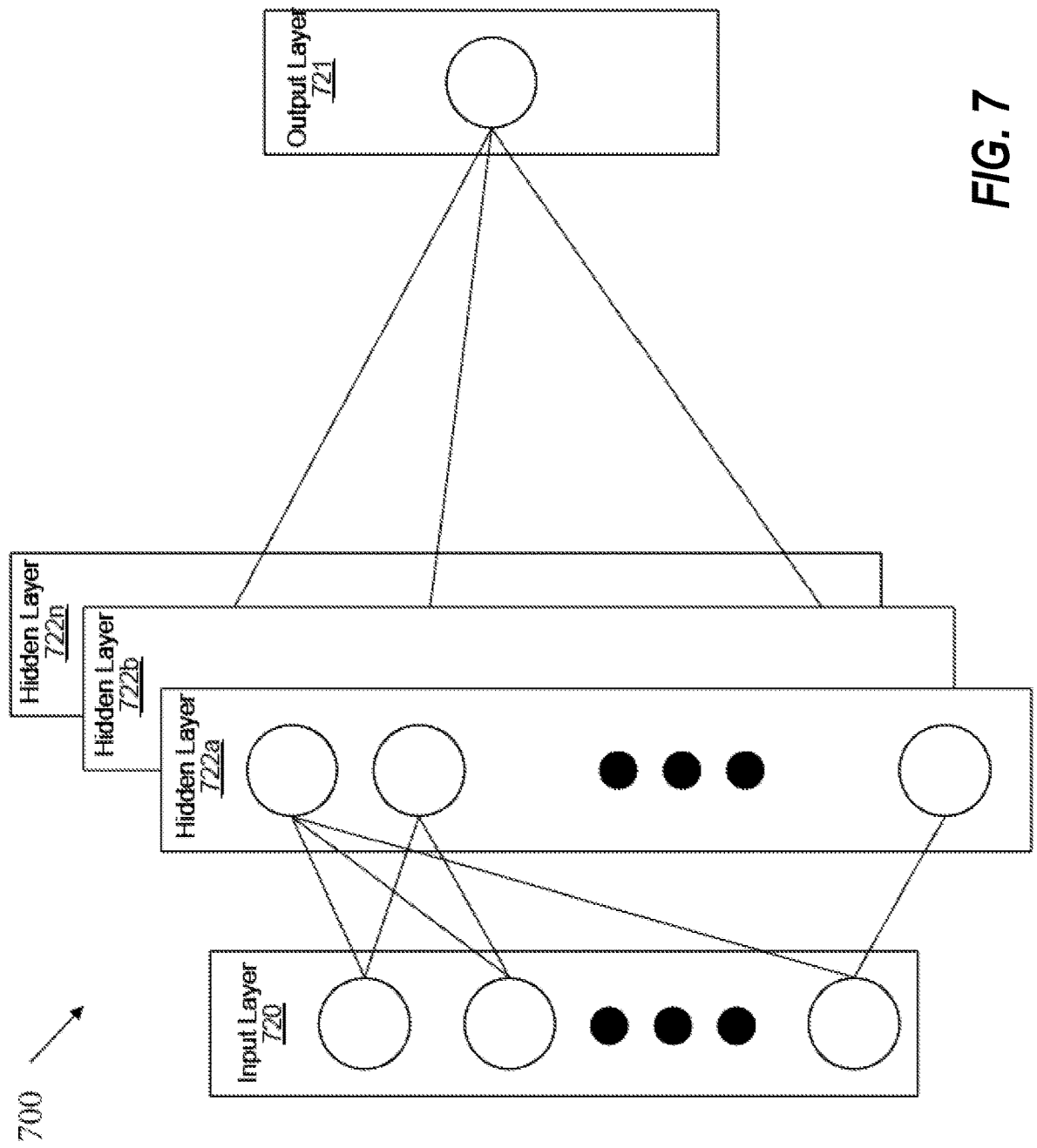
FIG. 7 illustrates an example of a deep learning neural network that can be used to implement a perception module and/or one or more validation modules, according to some aspects of the disclosed technology.

In FIG. 7, the disclosure now turns to a further discussion of models that can be used through the environments and techniques described herein. Specifically, FIG. 7 is an illustrative example of a deep learning neural network 700 that can be used to implement all or a portion of a perception module (or perception system) as discussed above. An input layer 720 can be configured to receive sensor data and/or data relating to an environment surrounding an AV. The neural network 700 includes multiple hidden layers 722*a*, 722*b*, through 722*n*. The hidden layers 722*a*, 722*b*, through 722*n* include "n" number of hidden layers, where "n" is an integer greater than or equal to one. The number of hidden layers can be made to include many layers for the given application. The neural network 700 further includes an output layer 721 that provides an output resulting from the processing performed by the hidden layers 722*a*, 722*b*, through 722*n*. In one illustrative example, the output layer 721 can provide estimated treatment parameters that can be used/ingested by a differential simulator to estimate a patient treatment outcome.

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the first hidden layer 722a can transform the information of each input node by applying activation functions to the input node information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 721, at which an output is provided. In some cases, while nodes in the neural network 700 are shown as having multiple output lines, a node can have a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 721.

In some cases, the neural network 700 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 700 is trained well enough so that the weights of the layers are accurately tuned.

To perform training, a loss function can be used to analyze errors in the output. Any suitable loss function definition can be used, such as a Cross-Entropy loss. Another example of a loss function includes the mean squared error (MSE), defined as $E\_total = \Sigma(\frac{1}{2}(target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 700 can perform a backward pass by determining which inputs (weights) most contributed to the loss of the network, and can adjust the weights so that the loss decreases and is eventually minimized.

The neural network 700 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for down sampling), and fully connected layers. The neural network 700 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 8:
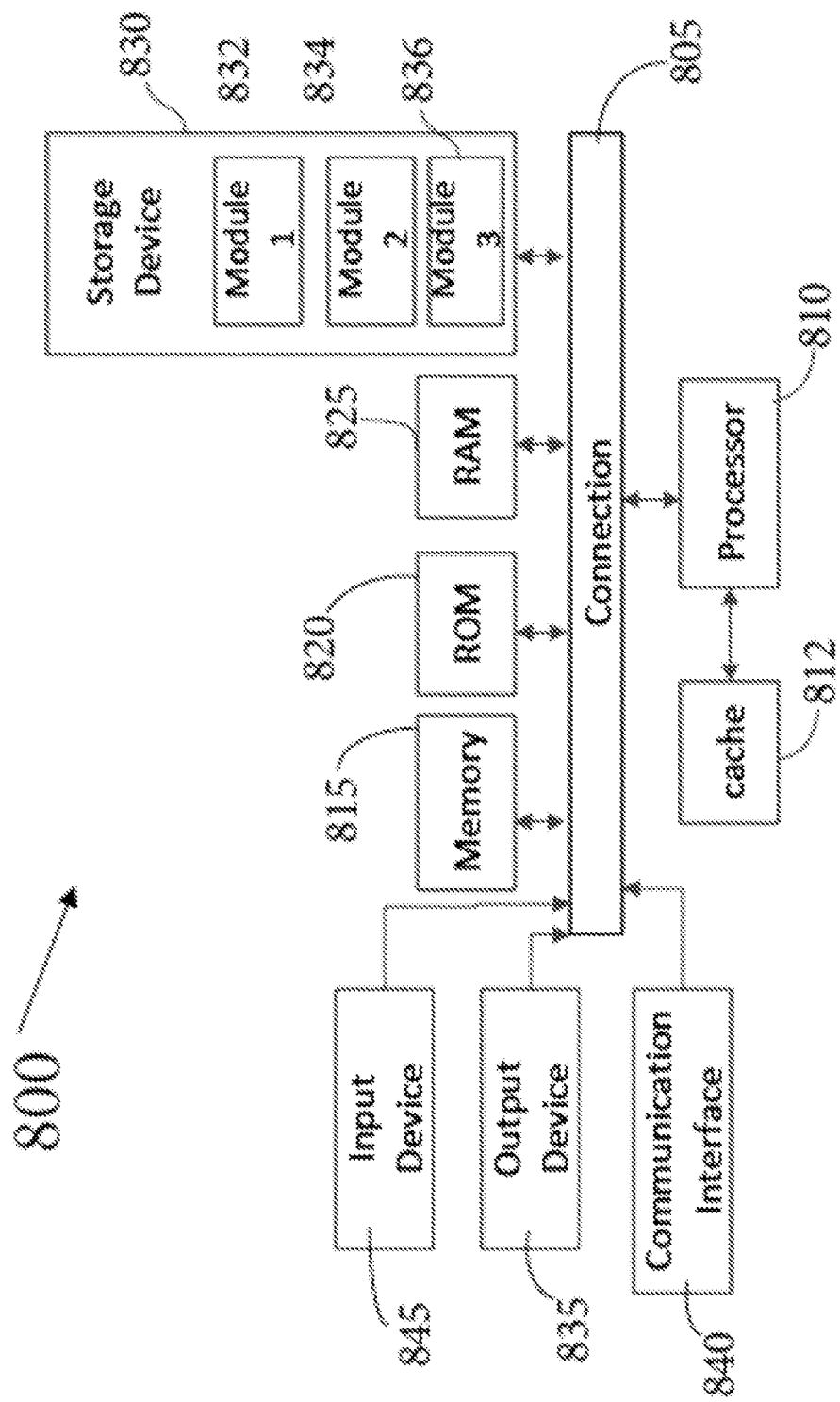
FIG. 8 illustrates an example processor-based system with which some aspects of the subject technology can be implemented.

FIG. 8 illustrates an example processor-based system with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L#), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with hardware components, such as processor 810, connection 805, output device 835, etc., to carry out the function.

Embodiments within the scope of the disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 includes a method for generating long-range objects dataset using proximal time-synced data for object detection models, where the method comprising receiving, by a processing device, a set of sensor data for a first autonomous vehicle (AV) corresponding to first scene data previously captured for the first AV, wherein the first scene data is part of an intersecting field of view (FoV) with second scene data of a second AV; inputting the set of sensor data to a simulated trained object detection model of the first AV to generate a first set of object detections for the first scene data; comparing the first set of object detections with a second set of object detections generated for the second scene data of the second AV; supplementing, based on the comparing, the first set of object detections with information from the second set of object detections in order to generate a supplemental set of object detections; and generating, using the supplemental set of object detections, a training data set for an object detection model of the first AV.

In Example 2, the subject matter of Example 1 can optionally include wherein the set of sensor data comprises RADAR sensor data, LIDAR sensor data, and camera data. In Example 3, the subject matter of any one of Examples 1-2 can optionally include wherein the simulated trained object detection model utilizes the LIDAR sensor data to generate the first set of object detections. In Example 4, the subject matter of any one of Examples 1-3 can optionally include wherein comparing the first set of object detections with the second set of object detections further comprises identifying overlapping tracked objects comprised in the first set of object detections and the second set of object detections, the overlapping tracked objects comprising detected objects having a location within a determined threshold distance of one another.

In Example 5, the subject matter of any one of Examples 1-4 can optionally include wherein supplementing the first set of object detections further comprises updating object information in the first set of object detections for the overlapping tracked objects that have a closer location to the second AV than the first AV. In Example 6, the subject matter of any one of Examples 1-5 can optionally include wherein the object information comprises at least one of location data, dimension data, or orientation data. In Example 7, the subject matter of any one of Examples 1-6 can optionally include wherein comparing the first set of object detections with the second set of object detections further comprises identifying one or more objects in the second set of object detections with corresponding RADAR point cloud data of the set of sensor data of the first AV.

In Example 8, the subject matter of any one of Examples 1-7 can optionally include wherein supplementing the first set of object detections further comprises adding object detections to first set of object detections that correspond to the identified one or more objects in the second set of object detections with corresponding RADAR point cloud data of the set of sensor data of the first AV. In Example 9, the subject matter of any one of Examples 1-8 can optionally include wherein the identified one or more objects comprise occluded objects with respect to the first AV.

In Example 10, the subject matter of any one of Examples 1-9 can optionally include wherein comparing the first set of object detections with the second set of object detections further comprises object location data and object point cloud velocity data of detected objects in the first set and the second set. In Example 11, the subject matter of any one of Examples 1-10 can optionally include wherein the first set of object detections does not include long-range objects and wherein the supplemental set of object detections does include the long-range objects.

Example 12 includes an apparatus for generating long-range objects dataset using proximal time-synced data for object detection models, the apparatus of Example 12 comprising one or more hardware processors to: receive a set of sensor data for a first autonomous vehicle (AV) corresponding to first scene data previously captured for the first AV, wherein the first scene data is part of an intersecting field of view (FoV) with second scene data of a second AV; input the set of sensor data to a simulated trained object detection model of the first AV to generate a first set of object detections for the first scene data; compare the first set of object detections with a second set of object detections generated for the second scene data of the second AV; supplement, based on the comparing, the first set of object detections with information from the second set of object detections in order to generate a supplemental set of object detections; and generate, using the supplemental set of object detections, a training data set for an object detection model of the first AV.

In Example 13, the subject matter of Example 12 can optionally include wherein the set of sensor data comprises RADAR sensor data, LIDAR sensor data, and camera data, and wherein the simulated trained object detection model utilizes the LIDAR sensor data to generate the first set of object detections. In Example 14, the subject matter of Examples 12-13 can optionally include wherein comparing the first set of object detections with the second set of object detections further comprises identifying overlapping tracked objects comprised in the first set of object detections and the second set of object detections, the overlapping tracked objects comprising detected objects having a location within a determined threshold distance of one another; and wherein supplementing the first set of object detections further comprises updating object information in the first set of object detections for the overlapping tracked objects that have a closer location to the second AV than the first AV.

In Example 15, the subject matter of Examples 12-14 can optionally include wherein comparing the first set of object detections with the second set of object detections further comprises identifying one or more objects in the second set of object detections with corresponding RADAR point cloud data of the set of sensor data of the first AV; and wherein supplementing the first set of object detections further comprises adding object detections to first set of object detections that correspond to the identified one or more objects in the second set of object detections with corresponding RADAR point cloud data of the set of sensor data of the first AV. In Example 16, the subject matter of Examples 12-15 can optionally include wherein the first set of object detections does not include long-range objects and wherein the supplemental set of object detections does include the long-range objects.

Example 17 is a non-transitory computer-readable storage medium for facilitating generating long-range objects dataset using proximal time-synced data for object detection models. The non-transitory computer-readable storage medium of Example 17 having stored thereon executable computer program instructions that, when executed by one or more processors, cause the one or more processors to: receive a set of sensor data for a first autonomous vehicle (AV) corresponding to first scene data previously captured for the first AV, wherein the first scene data is part of an intersecting field of view (FoV) with second scene data of a second AV; input the set of sensor data to a simulated trained object detection model of the first AV to generate a first set of object detections for the first scene data; compare the first set of object detections with a second set of object detections generated for the second scene data of the second AV; supplement, based on the comparing, the first set of object detections with information from the second set of object detections in order to generate a supplemental set of object detections; and generate, using the supplemental set of object detections, a training data set for an object detection model of the first AV.

In Example 18, the subject matter of Example 17 can optionally include wherein the set of sensor data comprises RADAR sensor data, LIDAR sensor data, and camera data, and wherein the simulated trained object detection model utilizes the LIDAR sensor data to generate the first set of object detections. In Example 19, the subject matter of Examples 17-18 can optionally include wherein comparing the first set of object detections with the second set of object detections further comprises identifying overlapping tracked objects comprised in the first set of object detections and the second set of object detections, the overlapping tracked objects comprising detected objects having a location within a determined threshold distance of one another; and wherein supplementing the first set of object detections further comprises updating object information in the first set of object detections for the overlapping tracked objects that have a closer location to the second AV than the first AV.

In Example 20, the subject matter of Examples 17-19 can optionally include wherein comparing the first set of object detections with the second set of object detections further comprises identifying one or more objects in the second set of object detections with corresponding RADAR point cloud data of the set of sensor data of the first AV; and wherein supplementing the first set of object detections further comprises adding object detections to first set of object detections that correspond to the identified one or more objects in the second set of object detections with corresponding RADAR point cloud data of the set of sensor data of the first AV.

Example 21 is a system for facilitating generating long-range objects dataset using proximal time-synced data for object detection models. The system of Example 21 can optionally include a memory to store a block of data, and one or more hardware processors communicably coupled to the memory, wherein the one or more hardware processors are to: receive a set of sensor data for a first autonomous vehicle (AV) corresponding to first scene data previously captured for the first AV, wherein the first scene data is part of an intersecting field of view (FoV) with second scene data of a second AV; input the set of sensor data to a simulated trained object detection model of the first AV to generate a first set of object detections for the first scene data; compare the first set of object detections with a second set of object detections generated for the second scene data of the second AV; supplement, based on the comparing, the first set of object detections with information from the second set of object detections in order to generate a supplemental set of object detections; and generate, using the supplemental set of object detections, a training data set for an object detection model of the first AV.

In Example 22, the subject matter of Example 21 can optionally include wherein the set of sensor data comprises RADAR sensor data, LIDAR sensor data, and camera data, and wherein the simulated trained object detection model utilizes the LIDAR sensor data to generate the first set of object detections. In Example 23, the subject matter of Examples 21-22 can optionally include wherein comparing the first set of object detections with the second set of object detections further comprises identifying overlapping tracked objects comprised in the first set of object detections and the second set of object detections, the overlapping tracked objects comprising detected objects having a location within a determined threshold distance of one another; and wherein supplementing the first set of object detections further comprises updating object information in the first set of object detections for the overlapping tracked objects that have a closer location to the second AV than the first AV.

In Example 24, the subject matter of Examples 21-23 can optionally include wherein comparing the first set of object detections with the second set of object detections further comprises identifying one or more objects in the second set of object detections with corresponding RADAR point cloud data of the set of sensor data of the first AV; and wherein supplementing the first set of object detections further comprises adding object detections to first set of object detections that correspond to the identified one or more objects in the second set of object detections with corresponding RADAR point cloud data of the set of sensor data of the first AV. In Example 25, the subject matter of Examples 21-24 can optionally include wherein the first set of object detections does not include long-range objects and wherein the supplemental set of object detections does include the long-range objects.

Example 26 includes an apparatus comprising means for performing the method of any of the Examples 1-11. Example 27 is at least one machine readable medium comprising a plurality of instructions that in response to being executed on a computing device, cause the computing device to carry out a method according to any one of Examples 1-11. Example 28 is an apparatus for facilitating generating long-range objects dataset using proximal time-synced data for object detection models, configured to perform the method of any one of Examples 1-11. Specifics in the Examples may be used anywhere in one or more embodiments.

The various embodiments described above are provided by way of illustration and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:
1. A method comprising:
receiving, by a processing device, a set of sensor data for a first autonomous vehicle (AV) corresponding to first scene data previously captured for the first AV, wherein the first scene data is part of an intersecting field of view (FoV) with second scene data of a second AV different from the first AV;

inputting the set of sensor data to a simulated trained object detection model of the first AV to generate a first set of object detections for the first scene data, wherein the simulated trained object detection model is an emulated version of an object detection model deployed on the first AV and is executed within a simulation platform using replicated sensor data corresponding to the first scene data;

comparing the first set of object detections with a second set of object detections generated for the second scene data of the second AV by a simulated trained object detection model of the second AV based on sensor data from the second AV;

supplementing, based on the comparing, the first set of object detections with information from the second set of object detections using overlapping tracked objects identified as being detected by both the first AV and the second AV in order to generate a supplemental set of object detections; and generating, using the supplemental set of object detections, a training data set for an object detection model of the first AV.

2. The method of claim 1, wherein the set of sensor data comprises RADAR sensor data, LIDAR sensor data, and camera data.

3. The method of claim 2, wherein the simulated trained object detection model utilizes the LIDAR sensor data to generate the first set of object detections.

4. The method of claim 1, wherein comparing the first set of object detections with the second set of object detections further comprises identifying the overlapping tracked objects comprised in the first set of object detections and the second set of object detections, the overlapping tracked objects comprising detected objects having a location within a determined threshold distance of one another.

5. The method of claim 4, wherein supplementing the first set of object detections further comprises updating object information in the first set of object detections for the overlapping tracked objects that have a closer location to the second AV than the first AV.

6. The method of claim 5, wherein the object information comprises at least one of location data, dimension data, or orientation data.

7. The method of claim 1, wherein comparing the first set of object detections with the second set of object detections further comprises identifying one or more objects in the second set of object detections with corresponding RADAR point cloud data of the set of sensor data of the first AV.

8. The method of claim 7, wherein supplementing the first set of object detections further comprises adding object detections to the first set of object detections that correspond to the identified one or more objects in the second set of object detections with corresponding RADAR point cloud data of the set of sensor data of the first AV.

9. The method of claim 7, wherein the identified one or more objects comprise occluded objects with respect to the first AV.

10. The method of claim 1, wherein comparing the first set of object detections with the second set of object detections further comprises object location data and object point cloud velocity data of detected objects in the first set and the second set.

11. The method of claim 1, wherein the first set of object detections does not include long-range objects and wherein the supplemental set of object detections does include the long-range objects.

12. An apparatus comprising:
one or more hardware processors to:
receive a set of sensor data for a first autonomous vehicle (AV) corresponding to first scene data previously captured for the first AV, wherein the first scene data is part of an intersecting field of view (FoV) with second scene data of a second AV different from the first AV;

input the set of sensor data to a simulated trained object detection model of the first AV to generate a first set of object detections for the first scene data, wherein the simulated trained object detection model is an emulated version of an object detection model deployed on the first AV and is executed within a simulation platform using replicated sensor data corresponding to the first scene data;

compare the first set of object detections with a second set of object detections generated for the second scene data of the second A V by a simulated trained object detection model of the second AV based on sensor data from the second AV;

supplement, based on the comparing, the first set of object detections with information from the second set of object detections using overlapping tracked objects identified as being detected by both the first AV and the second AV in order to generate a supplemental set of object detections; and generate, using the supplemental set of object detections, a training data set for an object detection model of the first AV.

13. The apparatus of claim 12, wherein the set of sensor data comprises RADAR sensor data, LIDAR sensor data, and camera data, and wherein the simulated trained object detection model utilizes the LIDAR sensor data to generate the first set of object detections.

14. The apparatus of claim 12, wherein comparing the first set of object detections with the second set of object detections further comprises identifying the overlapping tracked objects comprised in the first set of object detections and the second set of object detections, the overlapping tracked objects comprising detected objects having a location within a determined threshold distance of one another, and wherein supplementing the first set of object detections further comprises updating object information in the first set of object detections for the overlapping tracked objects that have a closer location to the second AV than the first AV.

15. The apparatus of claim 12, wherein comparing the first set of object detections with the second set of object detections further comprises identifying one or more objects in the second set of object detections with corresponding RADAR point cloud data of the set of sensor data of the first AV, and wherein supplementing the first set of object detections further comprises adding object detections to the first set of object detections that correspond to the identified one or more objects in the second set of object detections with corresponding RADAR point cloud data of the set of sensor data of the first AV.

16. The apparatus of claim 12, wherein the first set of object detections does not include long-range objects and wherein the supplemental set of object detections does include the long-range objects.

17. A non-transitory computer-readable medium having stored thereon instructions that, when executed by one or more processors, cause the one or more processors to:

receive a set of sensor data for a first autonomous vehicle (AV) corresponding to first scene data previously captured for the first AV, wherein the first scene data is part of an intersecting field of view (FoV) with second scene data of a second AV different from the first AV;

input the set of sensor data to a simulated trained object detection model of the first AV to generate a first set of object detections for the first scene data, wherein the simulated trained object detection model is an emulated version of an object detection model deployed on the first AV and is executed within a simulation platform using replicated sensor data corresponding to the first scene data;

compare the first set of object detections with a second set of object detections generated for the second scene data of the second AV by a simulated trained object detection model of the second AV based on sensor data from the second AV;

supplement, based on the comparing, the first set of object detections with information from the second set of object detections using overlapping tracked objects identified as being detected by both the first AV and the second AV in order to generate a supplemental set of object detections; and generate, using the supplemental set of object detections, a training data set for an object detection model of the first AV.

18. The non-transitory computer-readable medium of claim 17, wherein the set of sensor data comprises RADAR sensor data, LIDAR sensor data, and camera data, and wherein the simulated trained object detection model utilizes the LIDAR sensor data to generate the first set of object detections.

19. The non-transitory computer-readable medium of claim 17, wherein comparing the first set of object detections with the second set of object detections further comprises identifying overlapping tracked objects comprised in the first set of object detections and the second set of object detections, the overlapping tracked objects comprising detected objects having a location within a determined threshold distance of one another, and wherein supplementing the first set of object detections further comprises updating object information in the first set of object detections for the overlapping tracked objects that have a closer location to the second AV than the first AV.

20. The non-transitory computer-readable medium of claim 17, wherein comparing the first set of object detections with the second set of object detections further comprises identifying one or more objects in the second set of object detections with corresponding RADAR point cloud data of the set of sensor data of the first AV, and wherein supplementing the first set of object detections further comprises adding object detections to the first set of object detections that correspond to the identified one or more objects in the second set of object detections with corresponding RADAR point cloud data of the set of sensor data of the first AV.

* * * * *